(12) United States Patent
Calvo

(10) Patent No.: US 10,618,256 B2
(45) Date of Patent: Apr. 14, 2020

(54) PORCELAIN LAMINATE AND PROCEDURE FOR MANUFACTURING IT

(71) Applicant: Juan Lloveras Calvo, Saint Feliu de Codines (ES)

(72) Inventor: Juan Lloveras Calvo, Saint Feliu de Codines (ES)

(*) Notice: Subject to any disclaimer, the term of this patent is extended or adjusted under 35 U.S.C. 154(b) by 0 days.

(21) Appl. No.: 15/837,128

(22) Filed: Dec. 11, 2017

(65) Prior Publication Data

US 2018/0099482 A1    Apr. 12, 2018

Related U.S. Application Data

(62) Division of application No. 12/711,360, filed on Feb. 24, 2010, now abandoned.

(30) Foreign Application Priority Data

Nov. 11, 2009  (ES) .................................. 200902148
Nov. 12, 2009  (ES) .................................. 200901564
Dec. 17, 2009  (ES) .................................. 200901717

(51) Int. Cl.
*B32B 9/04*       (2006.01)
*B32B 15/04*      (2006.01)
(Continued)

(52) U.S. Cl.
CPC ................ *B32B 9/04* (2013.01); *B32B 15/04* (2013.01); *B32B 37/0015* (2013.01);
(Continued)

(58) Field of Classification Search
CPC ... B32B 9/04; B32B 37/1284; B32B 37/0015; B32B 37/0053; B32B 37/10;
(Continued)

(56) References Cited

U.S. PATENT DOCUMENTS 3,322,413 A    5/1967   William
3,401,493 A    9/1968   Linder
(Continued)

FOREIGN PATENT DOCUMENTS

DE    202006016106 U1    2/2007

OTHER PUBLICATIONS

Author: J. Martin-Marquez; Title: Effect of firing temperature on sintering of porcelain stoneware titles; year 2008.*

(Continued)

*Primary Examiner* — Vishal I Patel

(74) *Attorney, Agent, or Firm* — Banner & Witcoff, Ltd.

(57) ABSTRACT

The laminate comprises a porcelain sheet with a thickness of two to three millimetres, adhered to a base or support sheet made of MDF or particleboard or high density foam or polyethylene or polypropylene or ABS or foamed PVC or methacrylate or a metal sheet of aluminium or steel, using as the adhesion means a two-component polyurethane or a PUR adhesive, producing a laminate that encompasses the advantages of the nature of the two materials, the porcelain and the base, as well as saving material, and being lighter, having higher thermal and acoustic insulation levels, improved resistance to bending loads and allowing to add additional layers, such as a metal sheet of thickness from 0.1 to 1 mm in order to obtain a greater flatness, or a combination with rubber or elastomer layers to improve the acoustic insulation level.

5 Claims, 4 Drawing Sheets

(51) Int. Cl.
      *B32B 37/00*   (2006.01)
      *B32B 37/10*   (2006.01)
      *B32B 38/16*   (2006.01)
      *B32B 38/00*   (2006.01)
      *B32B 37/12*   (2006.01)

(52) U.S. Cl.
      CPC .......... *B32B 37/0053* (2013.01); *B32B 37/10* (2013.01); *B32B 37/1284* (2013.01); *B32B 38/162* (2013.01); *B32B 38/164* (2013.01); *B32B 2037/1269* (2013.01); *B32B 2038/0016* (2013.01); *B32B 2305/022* (2013.01); *B32B 2305/024* (2013.01); *B32B 2307/102* (2013.01); *B32B 2307/304* (2013.01); *B32B 2307/308* (2013.01); *B32B 2307/546* (2013.01); *B32B 2307/554* (2013.01); *B32B 2307/558* (2013.01); *B32B 2307/714* (2013.01); *B32B 2309/02* (2013.01); *B32B 2309/08* (2013.01); *B32B 2309/12* (2013.01); *B32B 2311/00* (2013.01); *B32B 2315/02* (2013.01); *B32B 2315/16* (2013.01); *B32B 2375/00* (2013.01); *B32B 2605/00* (2013.01); *B32B 2607/00* (2013.01); *Y10T 156/1062* (2015.01); *Y10T 428/2495* (2015.01); *Y10T 428/26* (2015.01); *Y10T 428/269* (2015.01)

(58) Field of Classification Search
      CPC ................ B32B 38/162; B32B 38/164; B32B 2037/1269; B32B 2038/0016; B32B 2305/022; B32B 2305/024; B32B 2307/102; B32B 2307/304; B32B 2307/308; B32B 2307/546; B32B 2307/554; B32B 2307/558; B32B 2307/714; B32B 2309/02; B32B 2309/08; B32B 2309/12; B32B 2311/00; B32B 2315/02; B32B 2315/16; B32B 2375/00; B32B 2605/00; B32B 2607/00; B32B 15/04; Y10T 428/269; Y10T 156/1062; Y10T 428/2495; Y10T 428/26
      See application file for complete search history.

(56) References Cited

U.S. PATENT DOCUMENTS

| | | | |
|---|---|---|---|
| 3,646,180 A * | 2/1972 | Winnick | B29C 44/12 264/45.3 |
| 3,701,711 A * | 10/1972 | Kelly | B32B 15/08 428/215 |
| 4,071,984 A | 2/1978 | Larrow | |
| 5,951,796 A | 9/1999 | Murray | |
| 7,182,833 B2 | 2/2007 | Ando et al. | |
| 2001/0031360 A1* | 10/2001 | Rudder | A47J 27/002 428/408 |
| 2003/0104241 A1* | 6/2003 | Rasshofer | B32B 15/08 428/626 |
| 2003/0113520 A1* | 6/2003 | Takahashi | B05D 5/061 428/201 |
| 2003/0152766 A1 | 8/2003 | Vargo et al. | |
| 2004/0213946 A1* | 10/2004 | Miller | B32B 7/02 428/57 |

OTHER PUBLICATIONS

J. Martin-Marquez, et al. Effect of firing temperature on sintering of porcelain stoneware tiles, Ceramics Interancional, 2008, pp. 1-13, vol. 34.

Jorge Martin-Marquez, et al. Effect of mircostructure on mechanical properties of porcelain stoneware. ScienceDirect, Apr. 29, 2010, pp. 1-7.

Fernanda Andreola, et al. Recycling of CRT panel glass as fluxing agent in the porcelain stoneware tile production. ScienceDirect, Feb. 17, 2007, pp. 1-7.

Jorge Martin-Marquez, et al. Mullite development on firing in porcelain stoneware bodies. ScienceDirect, Jul. 9, 2009, pp. 1599-1607.

A. Tucci, et al. New body mixes for porcelain stoneware tiles with improved mechanical characteristics. ScienceDirect, Jun. 9, 2006, pp. 1-7.

Jorge Martin-Marquez, et al. Evolution with temperature of crystalline and amorphous phases in porcelain stoneware . The American Ceramic Society, 2008, pp. 229-234.

* cited by examiner

… … …

PORCELAIN LAMINATE AND PROCEDURE FOR MANUFACTURING IT

CROSS-REFERENCE TO RELATED APPLICATIONS

The present application is a Divisional of application Ser. No. 12/711,360, filed Feb. 24, 2010, and claims the benefit of priority to Spanish Application No. 200902148, filed Nov. 11, 2009, and claims the benefit of priority to Spanish Application No. 200901564, filed Nov. 12, 2009, and claims the benefit of priority to Spanish Application No. 200901717, filed Dec. 17, 2009, the content of said applications is incorporated by reference herein.

OBJECT OF THE INVENTION

The object of the present invention is a porcelain laminate and the procedure for manufacturing it, wherein the laminate is formed by a sheet of porcelain stoneware of a small thickness joined to at least one base sheet or laminate.

The present invention is characterized by the nature of the materials combined in it, by the small thickness of the porcelain stoneware layer and by having layers of different nature disposed in a combined manner, to produce a laminate that obtains a synergic effect of the individual characteristics of each of the combined layers.

Therefore, the present invention falls in the field of laminates, and specifically laminates having one of their layers made of ceramic or porcelain stoneware.

The present invention is also characterised by the specific actions and stages required for the sheets that make up the laminate in order to attach them in a resistant and stable manner.

BACKGROUND OF THE INVENTION

Porcelain stonewares are characterised in that they have very low water absorption, are dry pressed, are not enameled and are subjected to a single firing. Their low porosity means that they have a very low water absorption of 0.1%. For this reason, vitrified porcelain can be used to produce pieces that are compact, slip-proof and very resistant to chemical agents, cleaning products and abrasion. Its hardness makes it an outstanding material for use in outdoor cladding, in cold or intensive-use areas.

In addition, it withstands sudden temperature changes, impact and wear well, and is a very hygienic material: its low retention of water and dirt hinders the presence of bacteria in kitchens and bathrooms, and it can also be used in swimming pools and premises where hygiene is essential.

Despite their qualities, the use of porcelain stoneware is limited for several reasons. On one hand, their high price, as they are undoubtedly some of the most expensive products used in cladding, and on the other their relatively high weight, which limits their use in large cladding surfaces. In addition, their use is limited is limited to pieces of moderate size, generally not more than 60 cm.times.60 cm.

Furthermore, some of their characteristics could be improved, such as their thermal and acoustic insulation properties, or their low bending capacity.

It is therefore the object of the present invention to develop a laminate that on one hand improves the price, weight and size limitations and also improves aspects such as thermal insulation, acoustic insulation and resistance to bending, obtaining a laminate as the one object of the present invention.

It is known that it is possible to manufacture porcelain sheets of limited thickness, on the order of 3 mm. However, these sheets are not used on their own, instead being mounted jointly and attached to other sheets of equal thickness, normally employing up to three sheets together to achieve the necessary structural strength, as otherwise, they would be very fragile during handling, installation and even in their use, when attached to a wall or mounted on a floor, as a simple impact could fracture the porcelain stoneware.

The aforementioned assemblies formed by three sheets of porcelain stoneware with thickness on the order of 3 mm have an additional drawback in that they need special tools for machining, requiring to hire a stonecutter.

Therefore, in order to overcome the limitations characteristic of low-thickness porcelain sheets, a laminate has been developed as the one object of the present invention in order to obtain an assembly having the outer appearance of a porcelain stoneware, a much lower weight and allowing to manufacture larger pieces, while having a less cumbersome manufacturing process and improved thermal and acoustic properties, as well as improved bending resistance.

DESCRIPTION OF THE INVENTION

The object of the invention is a porcelain laminate in which at least one of the sheets is made of a porcelain stoneware, and has at least one other sheet or layer which can be referred to as the base or supporting layer.

The thickness of the sheet made of porcelain stoneware ranges from 2 mm to 7 mm. This size is not limiting, but it is illustrative as the thickness of porcelain stoneware when used on their own is from 10 to 15 mm.

Different materials can be used for the support sheet, such as:

MDF (Medium Density Fibreboard);
Particleboard;
High density foam;
Polyethylene, polypropylene, ABS or foamed PVC;
Methacrylate;
HPL (High-Pressure Laminate) compact;
Plywood boards;
Aluminium or steel plate.

In combination with these base or support sheets, any other sheet of appropriate nature can be used as deemed appropriate to achieve a specific goal. Thus, it is possible to use a sheet of elastomer or rubber or EPDM to provide sound-proofing qualities to the laminate, that is, improving acoustic insulation as well as improving the flexibility of the laminate.

Different support sheets of different thickness will be used depending on the desired goals. Thus, when attempting to provide the laminate assembly with a certain resistance to bending without breaking, the porcelain sheet will be joined to a base or support sheet made of polyethylene.

If a porcelain sheet is joined to a base or support sheet made of wood, particleboard or MDF board, the laminate can be used to make a raised floor.

In addition, as an option and in a complementary manner it is possible to add to the aforementioned laminate a counterface or a sheet on the free face of the base or support sheet. The counterface sheet will be made of metal in order to provide a greater flatness of the laminate.

This metal counterface is used to reinforce the structural characteristics of the laminate, and can be used as a train floor, in addition having structural properties.

To improve the maximum deflection of the laminate, it is possible to add, to a laminate assembly formed by the porcelain sheet, the base or support sheet and the metal counterface or sheet, an additional foam sheet with a thickness from 20 to 70 mm glued in turn to a metal sheet.

It is also possible to use as the support sheet a laminate formed by several sandwich-style sheets consisting of a core of any of the aforementioned materials (MDF, particleboard, foams, polyethylene, methacrylate, HPL or plywood) which is laminated on both faces with corresponding metal sheets, in which the thickness of the metal sheets of either face of the core do not have to be the same.

It is also possible to use for the core material of the laminate a honeycomb-type material consisting of cells, which may be made of metal, aluminium or steel, or plastic, synthetic or cardboard, also having on both faces metal laminates.

In an alternative embodiment, the support sheet can be a laminate formed by a sheet of silicates or fibre cement with metal laminates in at least one of the faces. It is necessary to laminate silicates and fibrocement, as these materials are too fragile to use without laminating.

Another alternative embodiment is to use a sheet of porcelain stoneware to which is adhered a base sheet of any of the aforementioned materials (MDF, particleboard, foams, polyethylene, methacrylate, high-pressure laminate HPL or plywood) or, for example, birch wood, to which can be added another sheet of porcelain or silica quartz, which can be used for example to make partition walls.

The thickness of the base or support sheets can vary depending on the technical and aesthetic features desired. Thus, for the different base sheets the thickness can be in the following ranges:
  Polyethylene, polypropylene, ABS or foamed PVC sheets can have a thickness from 2 to 20 mm;
  MDF sheets can have a thickness from 4 or 5 mm to 30 mm, when a decorative effect is desired;
  High density foam sheets can have a thickness from a minimum of 6 mm to a maximum of 70 to 80 mm.
  Methacrylate sheets can have a thickness from 2 to 20 mm;
  HPL compact sheets can have a thickness from 1 to 30 mm;
  Plywood boards can have a thickness from 2 to 50 mm;
  Aluminium sheets can have a thickness from 0.4 to 3 mm and steel sheets from 0.5 to 3 mm;
  Particleboard sheets can have a thickness from 4 to 30 mm.

The result of the combination described above is a laminate with an outer face made of a porcelain sheet having a small thickness, from 2 to 7 mm, joined to a base or support sheet, which provides the following advantages:
  The laminate has external properties characteristic of the porcelain stoneware, that is, a high resistance to corrosion, abrasion, chemical attack, low water absorption, high resistance to temperature changes, impact and wear, and is also a very hygienic material as it has been cured at a temperature greater than 1000° C. and has very low porosity.
  The manufacturing costs of the laminate are significantly lower than those of a porcelain plate of the thickness normally used, ranging from 10 to 15 mm.
  The laminate has an improved resistance to bending.
  The laminate has improved thermal and acoustic insulation levels. Acoustic insulation is particularly improved in combination with rubbers or EPDM.
  As the porcelain sheet of the laminate has a small thickness, it can be machined manually with specialised numerical control tools and can be machined with tools used in the wood or metal sector.
  The laminate improves its impact absorption capacity, which is even better than that of Silestone®.
  The laminate obtained even has advantages compared to materials such as Silestone®. Silestone is a difficult material to machine, it is fragile against impacts and hot materials can leave marks on it.

To obtain a laminate such as that of the object of the invention, it has been necessary to develop a procedure that allows obtaining the laminate formed by a sheet of porcelain stoneware with a small thickness, on the order of 2 to 7 mm, joined to at least one base or support sheet. This procedure comprises the following stages:
  a) Cleaning the face of the porcelain stoneware that will be adhered to the base or support sheet by blowing, cleaning brushes and suction;
  b) Pre-treating the base or support sheet, in a manner depending on its composition:
  If a polyethylene sheet is used as the base sheet, the face of the base or support sheet to be glued can receive the following treatments:
    Crowning;
    Trimming
  c) Applying to the face of the base or support sheet a two-component polyurethane adhesive or a PUR adhesive.
  d) Adhering the porcelain sheet to the base or support sheet by gradually applying pressure. The pressure to apply will depend on the composition of the base or support sheet:
  If the base or support sheet is made of polyethylene, the pressure to apply is on the order of 15 to 20 Kg/cm2;
  If the base or support sheet is made of rubber, the pressure to apply is on the order of 30 Kg/cm2;
  If the base or support sheet is made of high density foam, the pressure to apply is on the order of 5 to 7 Kg/cm2;
  If the base or support sheet is made of methacrylate, the pressure to apply is on the order of 15 to 20 Kg/cm2;
  If the base or support sheet is made of MDF wood, the pressure to apply is on the order of 15 to 25 Kg/cm2;
  The rollers used to apply the pressure on the porcelain sheet have a hardness of 60 to avoid damaging the porcelain stoneware.
  e) Allowing the laminate assembly to rest for 3 or 4 days, preferably under pressure, using for example a metal bench or plate with the same dimensions as the laminate obtained.

If the laminate has a base or support sheet made of aluminium or steel, or if it has a non-metallic support sheet and a metallic counterface or sheet attached to the free face of the base or support sheet, before adhering it to the porcelain sheet or to the base or support sheet the metallic sheet is it is subjected to the following process:
  Scraping the metal sheets to a depth of 60 to 120 microns, uni-directionally in a longitudinal sense, so that in addition to cleaning grease, oil and dirt from the surface of the face that will be attached to the central core, one of the faces of the metal sheet is given a certain roughness. Scraping is performed with a grain size suitable for metal sheets.
  Applying a primer, a paint that attaches well to the metal, sealing it to prevent rusting and preparing the surface for the subsequent application of an adhesive.
  The primer must be a paint particularly suitable for adherence to the plastic materials and the adhesives used subsequently, both for two-component polyurethane and for reactive polyurethane adhesives.

Drying the primer in an oven at a temperature from 60-180° C.

Applying a special outdoor adhesive that can be of different types, including reactive polyurethane and two-component polyurethane adhesives. Applying the adhesive by the following methods:

With a roller;

Spraying it on;

With a pistol, applying lines or beads in a spiral form.

If the support sheet or assembly is a sandwich-type laminate with a laminate core in at least one of its faces, the manufacturing procedure will depend on the composition of the core.

Thus, if the material used in the laminate employed as support is MDF, particleboard, high density foam, polyethylene or polypropylene, methacrylate, high pressure laminate or plywood, once the laminate or assembly is conformed it is adhered directly to the porcelain sheet.

However, if the core of the support laminate is made of a silicate or fibre cement, the process is as follows:

Adhering a metal sheet to the back face of the porcelain panel;

Then adhering the silicate or fibre cement sheet;

Finally adhering another metal sheet.

DESCRIPTION OF THE DRAWINGS

To complete the description made below and to aid a better understanding of its characteristics, the present descriptive memory is accompanied by a set of drawings, the figures of which represent the most significant details of the invention for purposes of illustration only and in a non-limiting sense.

PREFERRED EMBODIMENT OF THE INVENTION

In view of the figures, a preferred embodiment of the proposed invention is described below.

Figure 1:
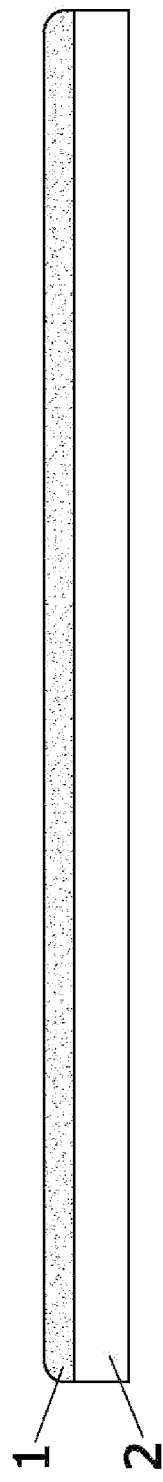
FIG. 1 shows a cross-section view of the laminate object of the invention.

FIG. 1 shows the basic and essential configuration of the laminate object of the invention, which comprises a porcelain sheet (1) with a small thickness of less than about 7 mm. This value should not be understood in a limiting sense, and is simply meant to illustrate the small thickness of the porcelain sheet; a reasonable thickness will be from 2 to 7 mm. This porcelain sheet (1) is adhered to a base or support sheet (2) that can have any composition, preferably one of the following or a combination thereof:

MDF (Medium Density Fibreboard);

Particleboard;

High density foam;

Polyethylene, polypropylene, ABS or foamed PVC;

Methacrylate;

HPL (High-Pressure Laminate) compact;

Plywood boards;

Aluminium or steel plate.

With this configuration, and as previously described, a synergic effect is obtained between the properties of the porcelain sheet (1) and those of the support sheet (2), defining a laminate with a great resistance to abrasion, wear, attack by chemical agents, as well as having an outstanding aesthetic result, while being lighter than a porcelain plate as used to date, increasing its bending resistance, increasing its acoustic insulation properties and being less expensive, as well as easier to machine.

Due to the aforementioned properties it has many applications, ranging from cladding partitions, facades, raised floors or for building ships, train cars, aircrafts, etc.

Figure 2:
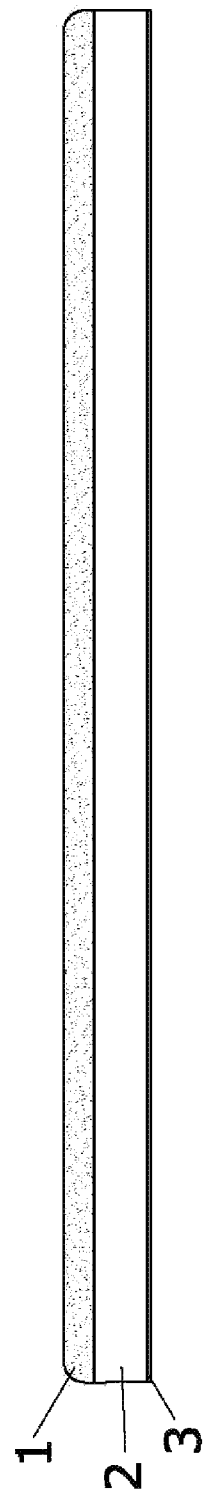
FIG. 2 shows a cross section of a mode of execution in which, in addition to the sheets shown in FIG. 1, there is a metal counterface or sheet adhered to the free face of the base or support sheet.

FIG. 2 shows an embodiment that complements the previous one, consisting of manufacturing a laminate which, in addition to the porcelain sheet (1) and the base or support sheet (2), has a metal sheet or metal counterface (3) with a small thickness, from 0.1 to 1 mm, these values being meant by way of orientation and example to show that the metal sheet has a small thickness.

This metal sheet (3) is used to maintain the flatness of the laminates manufactured. The material used to manufacture the metal sheet (3) or metal counterface (3) is preferably aluminium, steel or stainless steel. The composition of the metal sheet used is also not limiting.

The procedure used to adhere the porcelain sheet (1) to the base or support sheet (2) is as described above, while that used to adhere the base or support sheet (2) to the metal sheet (3) has also been described in the description of the invention.

Figure 3:
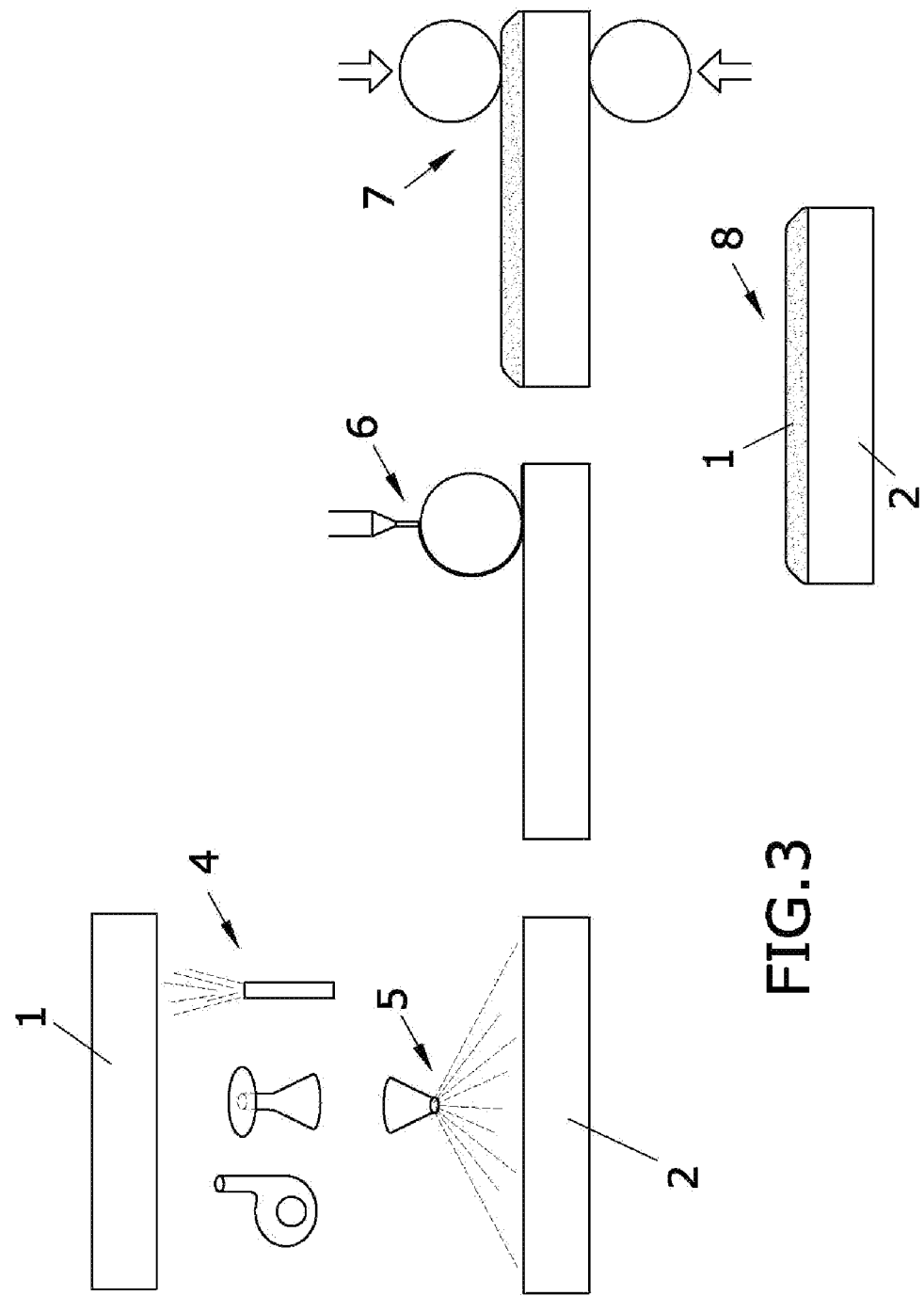
FIG. 3 shows a schematic view of the various stages of the manufacturing process.

FIG. 3 shows the different stages required to adhere the porcelain sheet (1) and the base or support sheet (2). These stages are the following:

a) Cleaning (4) the face of the porcelain stoneware that will be adhered to the base or support sheet by blowing, cleaning brushes and suction;

b) Pre-treating (5) the base or support sheet according to its composition;

c) Applying (6) to the face of the base or support sheet a two-component polyurethane adhesive or a PUR adhesive;

d) Adhering (7) the porcelain sheet to the base or support sheet by gradually applying pressure.

The rollers used to apply the pressure on the porcelain sheet have a hardness of 60, to avoid damaging the porcelain stoneware;

e) Allowing the laminate assembly to rest (8) for 3 or 4 days, preferably under pressure, using for example a metal bench or plate with the same dimensions as the laminate obtained.

If a polyethylene sheet is used as the base sheet, the face of the base or support sheet to be adhered can receive the following pre-treatment:

Crowning;

Trimming.

Figure 4:
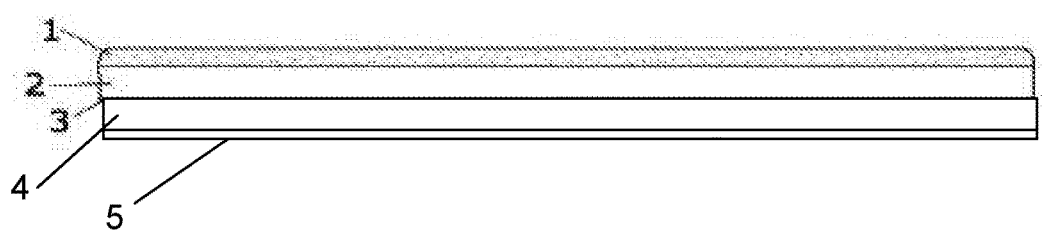
FIG. 4 to FIG. 7 show different embodiments of the laminate.

In FIG. 4, it can be observed that a foam sheet (4) and a second metal sheet (5) are adhered to the above-described assembly formed by the porcelain stoneware (1), the base support sheet (2), and the metal sheet or metal counterface (3).

Figure 5:
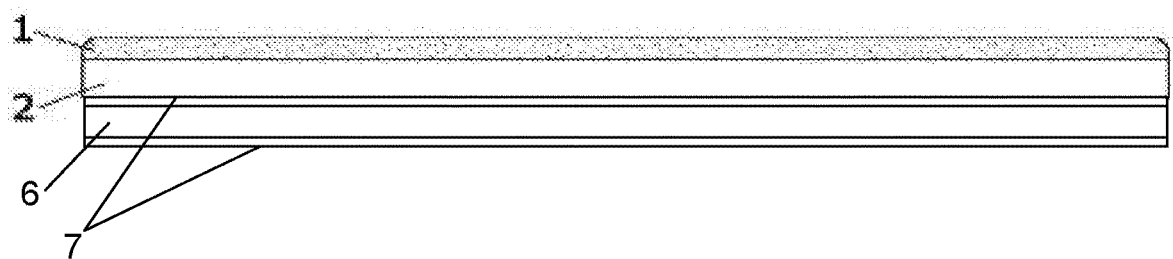

In FIG. 5, it is shown how the base or support sheet consists of a laminate with a core (6) that can be made of any of the aforementioned materials (MDF, particleboard, foams, polyethylene, methacrylate, HPL or plywood) and that is laminated on both faces with corresponding metal sheets (7), wherein the thickness of the metal sheets of either face of the core do not have to be the same.

Figure 6:
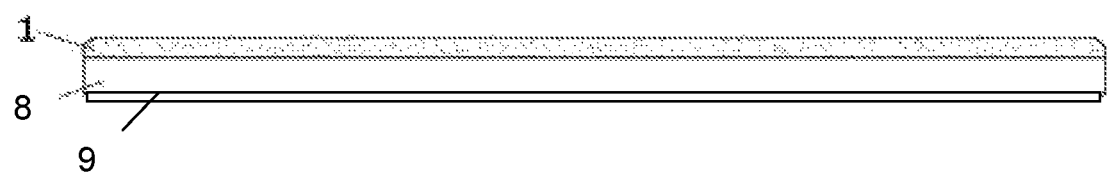

In FIG. 6, it is observed that the base support sheet is a laminate formed by a sheet of silicates or fibre cement (8) having metal laminate (9) in at least one of the faces.

Figure 7:
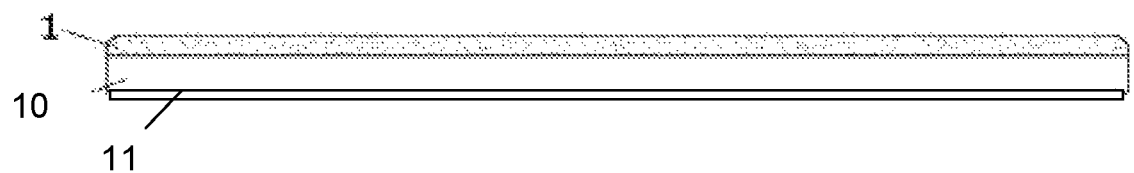

In FIG. 7, it is observed that the base or support sheet is made of one of the materials (MDF, particleboard, foams, polyethylene, methacrylate, high pressure laminate or plywood) (10) and has an additional sheet or counterface (11) made of porcelain stoneware or silica quartz.

The essence of this invention is not affected by variations in the materials, shape, size and arrangement of its component elements, described in a non-limiting manner that will allow its reproduction by an expert.

The invention claimed is:

1. A procedure for manufacturing a porcelain laminate, comprising:

cleaning the face of a single sheet of porcelain stoneware with a thickness from 2 to 7 mm that will be adhered to a first aluminum sheet with a thickness from 0.1 mm to 1 mm by blowing, cleaning brushes and suction;

pre-treating the first aluminum sheet;

adhering the single sheet of porcelain stoneware to the first aluminum sheet by gradually applying rolling pressure with a roller having a hardness of 60;

adhering a layer of high-pressure laminate (HPL) with a thickness from 1 mm to 30 mm to the first aluminum sheet;

adhering a second aluminum sheet with a thickness from 0.1 mm to 1 mm to the high-pressure laminate; and applying pressure to form the porcelain stoneware laminate.

2. The procedure for manufacturing the porcelain laminate according to claim 1, scraping the a face of the first aluminum sheet to a depth of 60 to 120 microns, unidirectionally in a longitudinal sense, so that the face that will be attached to the layer of high pressure laminate; said scraping being performed with a grain size suitable for the first aluminum sheet;

applying a layer of primer that attaches to the first aluminum sheet, sealing the layer of primer so as to prevent rusting and preparing a top surface of the primer for the subsequent application of an adhesive; the primer being suitable for adherence to plastic materials and adhesives used subsequently, both for two-component polyurethane and for reactive polyurethane adhesives;

drying the primer in an oven at a temperature from 60-180° C.;

applying an outdoor adhesive selected from a group consisting of reactive polyurethane and two-component polyurethane adhesives; applying the outdoor adhesive selected from a group of least one of rolling, spraying; and applying lines or beads in a spiral form.

3. The procedure for manufacturing the porcelain laminate according to claim 2, further comprising after applying pressure, adhering a foam sheet with a thickness from 20 to 70 mm to the second aluminum sheet.

4. The procedure for manufacturing the porcelain laminate according to claim 1, further comprising a step of prior to adhering the single sheet of porcelain stoneware to the first aluminum sheet, applying to a face of the first aluminum sheet, a two-component polyurethane adhesive or a polyurethane reactive PUR adhesive.

5. The procedure for manufacturing the porcelain laminate according to claim 2, further comprising a step of prior to adhering the single sheet of porcelain stoneware to the first aluminum sheet, applying to a face of the first aluminum sheet, a two-component polyurethane adhesive or a polyurethane reactive PUR adhesive.

* * * * *